July 2, 1963 L. BONO 3,095,752
CHANGE SPEED ARRANGEMENT FOR SEWING MACHINES
Filed April 25, 1960 2 Sheets-Sheet 1

Inventor
Luigi Bono
By Stevens Davis Miller & Mosher
Attorneys

United States Patent Office 3,095,752
Patented July 2, 1963

3,095,752
CHANGE SPEED ARRANGEMENT FOR
SEWING MACHINES
Luigi Bono, Pavia, Italy, assignor to Necchi Societa per
Azioni, Pavia, Italy, a company of Italy
Filed Apr. 25, 1960, Ser. No. 24,554
Claims priority, application Italy May 11, 1959
2 Claims. (Cl. 74—217)

It is of interest to allow a modification in the operative speed of a sewing machine in accordance with the kind of sewing which is to be executed.

The present invention has for its object a mechanical change speed arrangement providing two different speeds and cutting out the use of gear wheels which generally produce an undesirable noise, said change speed arrangement being characterized by the ease of its operation, even during running of the sewing machine.

With such an ararngement, the passage from one speed to the other is obtained in practice through a mere pivotal motion of an outer control member which is shifted from one predetermined position to another.

The object of the present invention consists chiefly in means ensuring the connection and disconnection of pulleys carried by two shafts of the sewing machine to which are operatively connected in the conventional manner the parts forming the stitches. More specifically, the improved change speed arrangement according to the invention includes two shafts permanently connected through transmission members and two pulleys mounted loose on the corresponding shafts and the diameters of which are different, said pulleys being permanently interconnected by transmission members and being driven into a rotary movement applied by the driving means of the machine to the first of said pulleys, two clutches being provided for positively engaging each pulley selectively with the corresponding shaft and being controlled in a manner such that the engagement and disengagement of one pulley coincide with the disengagement and engagement of the other pulley with reference to its shaft.

The invention will now be disclosed with further detail, reference being made to the accompanying drawings illustrating an embodiment thereof given by way of a mere exemplification and without any binding sense being attached thereto. In said drawings.

Figure 1:
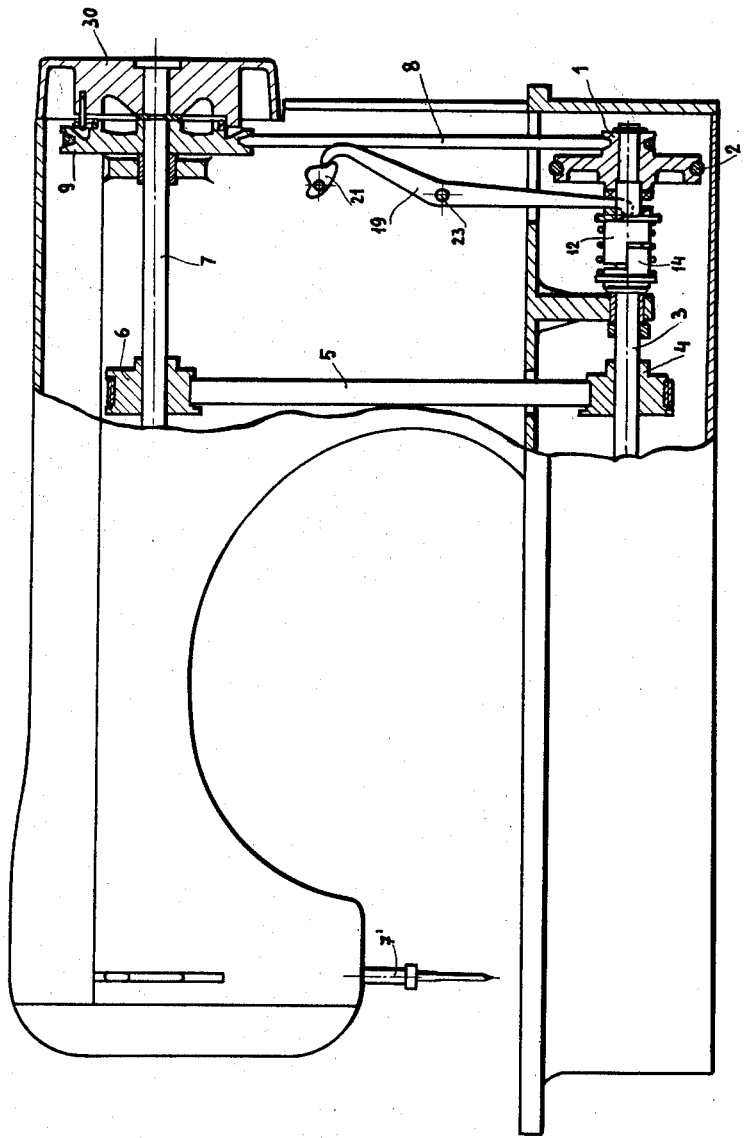
FIG. 1 is a side view of the sewing machine, partly sectional, so as to show the arrangement forming the object of the invention.
Figure 3:
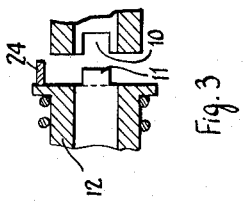
FIG. 3 is a horizontal detail sectional view of the clutch through line III—III of FIG. 2.
Figure 2:
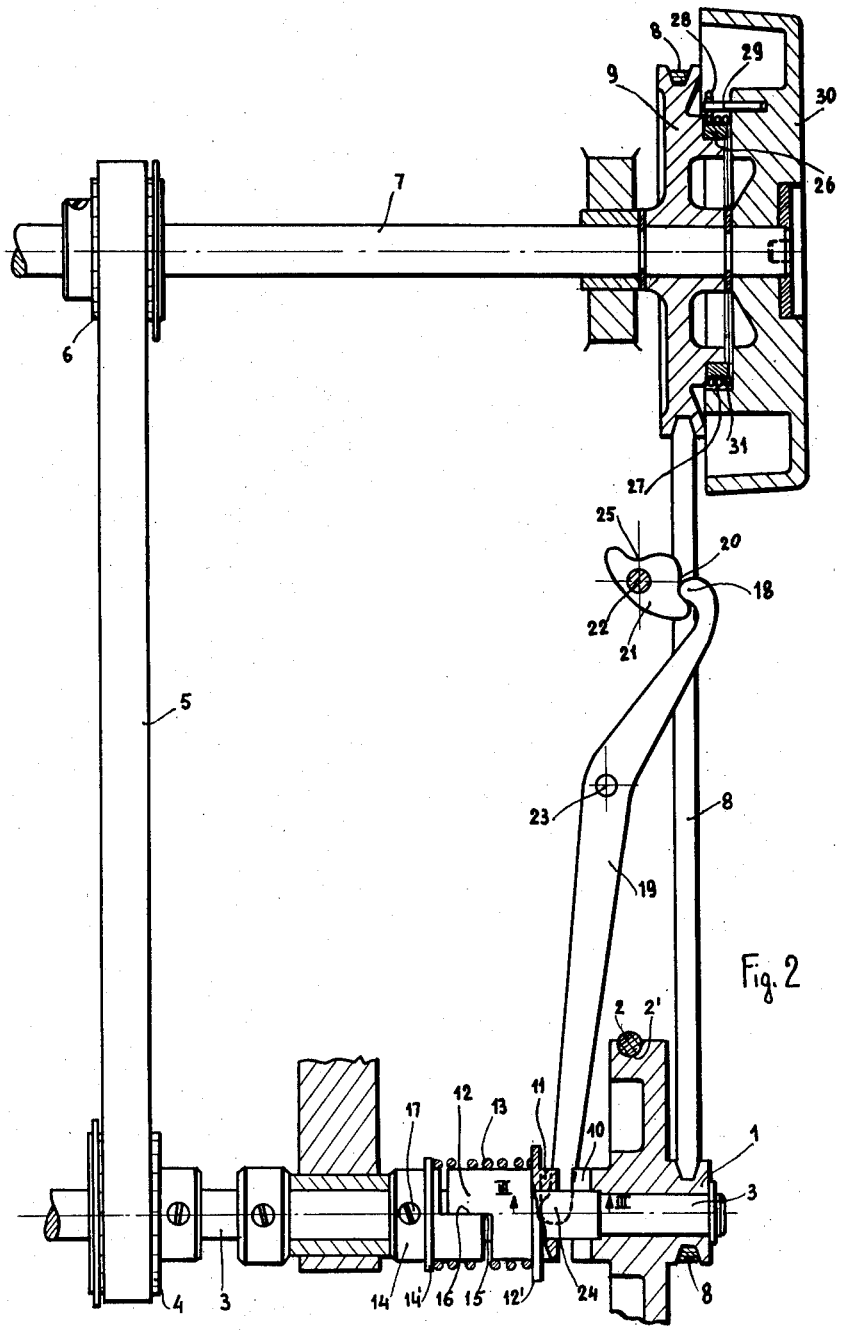
FIG. 2 illustrates similarly said arrangement on a larger scale.

As illustrated, the pulley 1 is driven permanently by a driving member which is not illustrated and which may act, for instance, through the agency of the belt 2 engaging the groove 2' formed in the body of said pulley 1. The pulley 1 is mounted loose on the lower shaft 3 which is rigid with a second pulley 4 connected by a belt 5 with a third pulley 6 which is, in its turn, rigid with the upper shaft 7, to provide a permanent operative interconnection between the two shafts.

The pulley 1 is, on the other hand, connected through the belt 8 with a fourth pulley 9 revolvably carried by the upper shaft 7. The shaft 7 may, for instance, drive in the conventional manner, which need not be described, the needle-carrying bar 7', so that the latter may assume a vertical reciprocating movement, while the lower shaft 3 controls the other parts of the machine, such as the means producing a progression of the fabric and the looper, which are not illustrated in the drawings.

The pulleys 4 and 6 interconnected by the belt 5 have the same diameter and they are provided with teeth, so as to prevent any slip between the shafts 3 and 7 and to ensure thereby an unvarying phase relationship between the movements of the different parts of the sewing machine. If the pulley 1 is engaged and made rigid with the shaft 3 in the manner described hereinafter and if the pulley 9 remains revolvable over the shaft 7, the transmission of movement from the driving belt 2 is performed through the successive parts 1, 3, 4, 6 to the shaft 7, the shaft 3 controlling thus the shaft 7.

Conversely, if the pulley 1 remains loose on the shaft 3 and the pulley 9 is rigidly secured to the shaft 7, the transmission is performed through the successive parts 1, 9, 7, 4 to the shaft 3 which is thus controlled by the shaft 7. Whereas, in the first case, the two shafts revolve at the angular speed applied to them by the driving member through the agency of the belt 2, in the second base, said speed is modified according to the ratio between the diameters of the pulleys 1 and 9. The pulley 1, which is fitted loose on the shaft 3, includes inside its hub a clutch component 10 into which may be urged the other clutch component 11 carried by a sleeve 12 slidably fitted on the shaft 3, whereby the engagement of the clutch is performed under the action of the spring 13 held between the flanges 12' and 14' of the interengaging coaxial sleeves 12 and 14. The sleeve 12, slidably carried by the shaft 3, engages permanently, through its surface 15 extending diametrically with reference to said shaft; the corresponding surface 16 of the sleeve 14 secured to the shaft 3 by the screw 17, whereby said sleeve is constrained to rotate in unison with the sleeve 14 and the shaft 3.

When it is desired to make the machine operate at a reduced speed, it is necessary to leave the pulley 1 in its disengaged condition on the shaft 3 and, at the same time, the pulley 9 is to be engaged with the shaft 7. To this end, the lever 19 is caused to rock around its pivot 23 under the action of a rocking of the eccentric member or cam 21 which is caused to engage said tip 18 of the lever 19 through its outermost section 20 corresponding to a maximum radius. This produces a rocking of the lever 19 around its pivot 23 and it is performed through a suitable angular shifting of the pivot 22 rigid with the cam and revolvably carried in the frame of the sewing machine, in unison with an outer grip which is not illustrated. This operation makes the lever 19 rock around its pivot 23 and its lower end 24 acting on the flange 12' of the sleeve 12 against the pressure of the spring 13 produces a disconnection between the components 14 and 11 of the clutch, so that the pulley 1 is now revolvable over the shaft 3.

It should be understood that the clutch inserted between the shaft 3 and the pulley 1 may be executed in a manner different from that disclosed without unduly widening thereby the scope of the invention as defined in the accompanying claims. For instance, it is possible to resort to a spring surrounding the pulley 1 and of which one end is secured to the shaft 3, while the other is free and may be subjected to a pressure exerted by the end 24 of the lever 19 when it is desired to disconnect the pulley.

The pulley 1 produces, through the belt 8, the rotation of the pulley 9 around the cylindrical surface 26 of which is wound a spring 27 operatively engaging said surface. The end 28 of said spring is secured to a pin 29 rigid with the small handwheel 30, while the other end 31 of the spring is free. Thus, the pulley 9 drives into rotation the small handwheel 30 for a predetermined direction of rotation, as provided by the direction of the winding of the spring 27 around the surface 26 of the pulley, while a rotation in the opposite direction of the pulley 9 would produce an expansion and a sliding of the spring over said cylindrical surface 26, whereby the pulley 9 is then disengaged with reference to the small handwheel 30.

When it is desired to make the machine operate at maximum speed, it is necessary, in contradistinction, to make the pulley 1 rigid with the shaft 3 and, at the same time, to release the pulley 9 with reference to the shaft 7. To this end, the cam 21 is shifted so that its point of minimum radius engages the upper end 18 of the lever 19. Thus, the lower end 24 of the lever 19 opposes no longer the pressure exerted by the spring 13 and said spring urges the clutch component 11 into engagement with the other clutch component 10 inside the pulley 1. The latter is therefore now rigid with the shaft 3 and transmits directly its movement to the pulley 4 and, consequently, through the agency of the belt 5, to the pulley 6 and to the shaft 7. The shaft 7 and, consequently, the small handwheel 30 rotate then at the speed given by the driving member through the agency of the belt 2, so that said speed is higher than that applied at the same moment to the pulley 9 through the agency of the belt 8. Thus, the relative movement of the pulley 9 with reference to the handwheel 30 is performed in the direction for which the spring 27 expands and slides over the cylindrical surface 26. Consequently, the pulley 9 revolves freely, as required, round the shaft 7. However, it should be understood that the engagement provided between the pulley 9 and the small handwheel 30 is performed in the direction for which the spring 27 expands and slides over the cylindrical surface 26. Consequently, the pulley 9 revolves freely, as required, round the shaft 7. However, it should be understood that the engagement provided between the pulley 9 and the small handwheel 30 may be obtained in a manner different from the arrangement described, always in accordance with the principle consisting in modifying the relative direction of movement between the pulley and the handwheel, so as to obtain the engagement or disengagement between the latter.

It is possible, for instance, to replace the unidirectional friction-operated device including the pulley 9, the small handwheel 30 and the spring 27 by other arrangements of a different structure and, for instance, it is possible to provide, instead of the spring 27, rollers or pins adapted to ensure the engagement or the disengagement between the pulley and the handwheel, according to the direction of the relative movement between the last-mentioned parts, without any widening thereby of the scope of the present invention as defined in the accompanying claims.

I claim:

1. In a sewing machine having first and second mainshafts, a drive system for driving said mainshafts in timed relation and at selected relative speeds, a first pulley rotatably journaled on said first mainshaft, a manually controllable positive drive clutch between said first pulley and said first mainshaft for connecting the same together for rotation in unison, a second pulley rigidly connected to said first mainshaft, a third pulley rigidly connected to said second mainshaft, a first flexible drive member entrained over and coupling together said second and third pulleys in driving relation, a fourth pulley rotatably journaled on said second mainshaft in alignment with said first pulley, a second flexible drive member entrained over and coupling together said first and fourth pulleys in driving relation, an automatic clutch between said fourth pulley and said second mainshaft, and means for driving one of said first and fourth pulleys whereby said first mainshaft is driven from said second mainshaft when said positive drive clutch is disengaged and said second mainshaft is driven from said first mainshaft when said positive drive clutch is engaged, said automatic clutch being of the overrunning type and said second and third pulleys driving said second main shaft at a greater speed than said first and fourth pulleys.

2. The drive system of claim 1 wherein a sewing machine hand wheel is secured to said second main shaft immediately adjacent said fourth pulley, and said automatic clutch is carried by said hand wheel and said fourth pulley.

References Cited in the file of this patent

UNITED STATES PATENTS

| | | |
|---|---|---|
| 1,210,798 | Harriman | Jan. 2, 1917 |
| 1,854,349 | Satkowski et al. | Apr. 19, 1932 |
| 2,077,058 | Rambausek | Apr. 13, 1937 |
| 2,643,749 | Greenlee | June 30, 1953 |
| 2,788,758 | Attwood et al. | Apr. 16, 1957 |
| 2,885,896 | Hungerford et al. | May 12, 1959 |
| 2,988,029 | Herbst | June 13, 1961 |